(12) United States Patent
Chuang (10) Patent No.: US 11,845,506 B2
(45) Date of Patent: Dec. 19, 2023

(54) BOTTLE CAGE (71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 17/743,549

(22) Filed: May 13, 2022

(65) Prior Publication Data

US 2023/0034876 A1  Feb. 2, 2023

(30) Foreign Application Priority Data

Aug. 2, 2021  (TW) .................................. 110128421

(51) Int. Cl.
  *B62J 11/04*  (2020.01)
  *B62J 45/00*  (2020.01)

(52) U.S. Cl.
  CPC .............. *B62J 11/04* (2020.02); *B62J 45/00* (2020.02)

(58) Field of Classification Search
  CPC .................................. B62J 11/04; B60R 25/33
  See application file for complete search history.

(56) References Cited

U.S. PATENT DOCUMENTS

| | | | | |
|---|---|---|---|---|
| 6,060,982 A * | 5/2000 | Holtrop | ..................... | B62H 5/20 340/432 |
| 7,886,947 B2 * | 2/2011 | Campagnolo | .......... | B62M 25/08 224/440 |
| 8,469,248 B2 * | 6/2013 | Weng | ...................... | B62J 11/04 224/547 |
| D898,613 S * | 10/2020 | Stapleton | ..................... | D11/216 |
| 10,842,246 B1 * | 11/2020 | Rivera | ...................... | H04R 1/08 |
| D964,193 S * | 9/2022 | Deng | ............................. | D10/74 |
| D968,984 S * | 11/2022 | Lee | ................................. | D10/74 |
| D972,947 S * | 12/2022 | Xie | ................................. | D10/70 |
| D976,576 S * | 1/2023 | Sirichai | ......................... | D3/207 |
| 2005/0056670 A1 | 3/2005 | Campagnolo | | |
| 2005/0156001 A1 | 7/2005 | Dal Pra et al. | | |
| 2013/0150028 A1 * | 6/2013 | Akins | .................. | H04W 4/029 455/456.3 |
| 2016/0129960 A1 * | 5/2016 | Akins | .................. | H04W 4/021 340/427 |
| 2020/0240622 A1 * | 7/2020 | Austin | ................ | F21V 21/0832 |
| 2022/0073160 A1 * | 3/2022 | Dotter | ................... | H04W 76/10 |
| 2023/0034876 A1 * | 2/2023 | Chuang | .................... | B62J 45/00 |
| 2023/0182849 A1 * | 6/2023 | Young | ...................... | B62J 45/42 224/412 |

FOREIGN PATENT DOCUMENTS

| | | | |
|---|---|---|---|
| CN | 208665418 U | | 3/2019 |
| CN | 112874666 A | * | 6/2021 |
| CN | 215399059 U | * | 1/2022 |
| CN | 218942436 U | * | 5/2023 |
| DE | 102011119709 A1 | * | 6/2013 |
| DE | 202021002013 U1 | * | 8/2021 |

(Continued)

*Primary Examiner* — Justin M Larson (57) ABSTRACT

A bottle cage includes a storage space. The storage space has a wide section and a narrow section arranged axially along a reference line. The wide and the narrow sections include widths thereof extending transversely to the reference line. The wide section has a first width and the narrow section has a second width respectively. The second width is smaller than the first width. The storage space includes an electronic device with satellite positioning function installed therein in a separable installation manner.

9 Claims, 9 Drawing Sheets

(56) References Cited

FOREIGN PATENT DOCUMENTS

| EP | 3904165 | A1 | * | 11/2021 | ........... B60R 25/102 |
|----|---------|----|----|---------|------------------|
| KR | 20180036030 | A | * | 4/2018 | |
| TW | M507378 | U | | 8/2015 | |
| TW | M577469 | U | | 5/2019 | |
| TW | 776620 | B1 | * | 9/2022 | |

* cited by examiner

BOTTLE CAGE

BACKGROUND OF THE INVENTION

1. Field of the Invention

The present invention relates to a bottle cage and, particularly, to a bottle cage on which an electronic device with satellite positioning function is adapted to be installed.

2. Description of the Related Art

Riding a bike is environmentally friendly and energy-saving, and allows the body to exercise. There are already a large number of people using bikes as a way of leisure, or use bikes as a leisure way of transportation on holidays. Unfortunately, as more bikes hit the streets bike theft has also gone up, even using additional locks.

The present invention is, therefore, intended to obviate or at least alleviate the problems encountered in the prior art.

SUMMARY OF THE INVENTION

According to the present invention, a bottle cage includes a storage space. The storage space has a wide section and a narrow section arranged axially along the reference line. The wide and the narrow sections include widths thereof extending transversely to the reference line. The wide section has a first width and the narrow section has a second width respectively. The second width is smaller than the first width. The storage space includes an electronic device with satellite positioning function installed therein in a separable installation manner.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
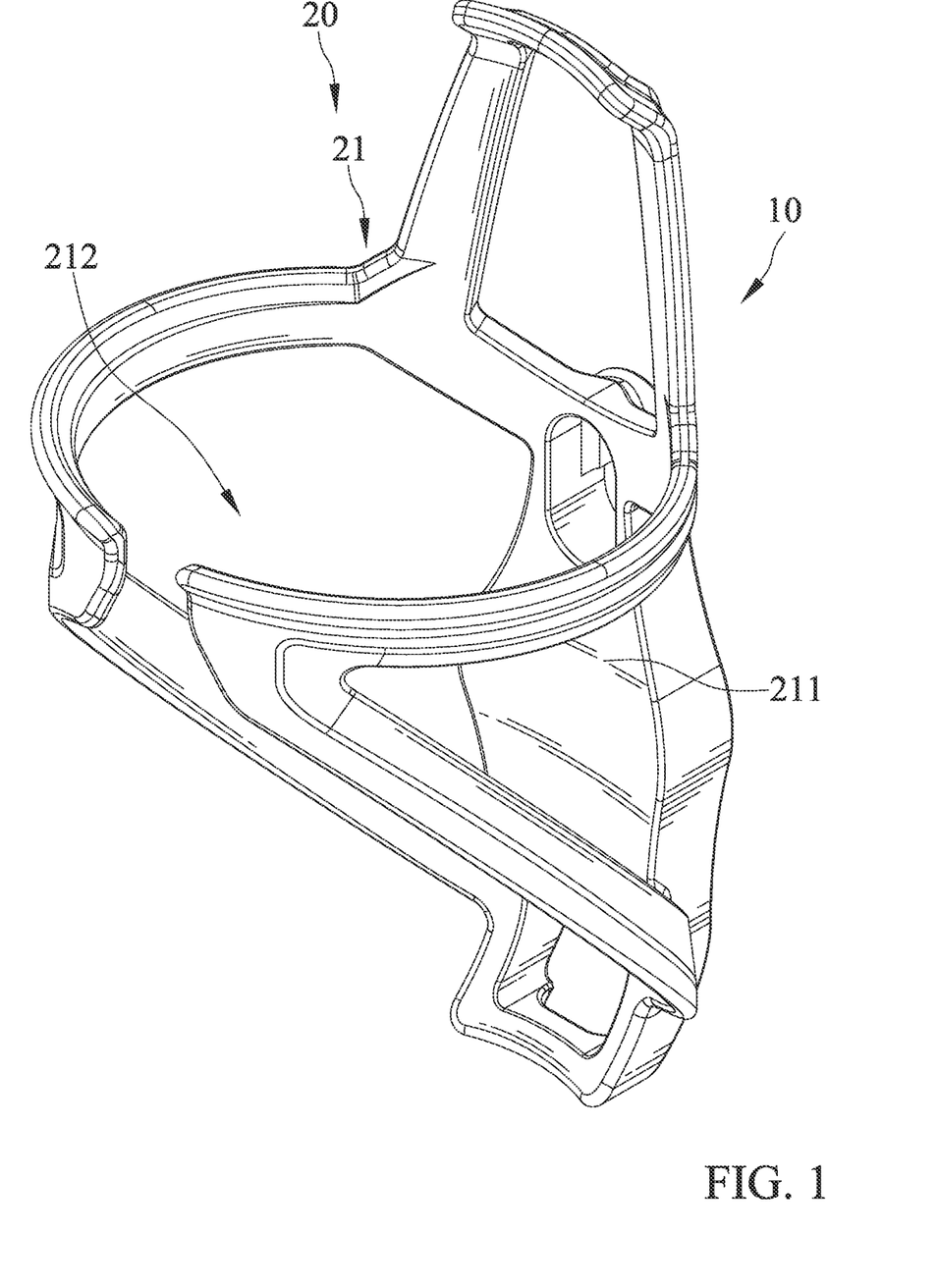
FIG. 1 is a perspective view of a bottle cage in accordance with a first to embodiment of the present invention.
Figure 2:
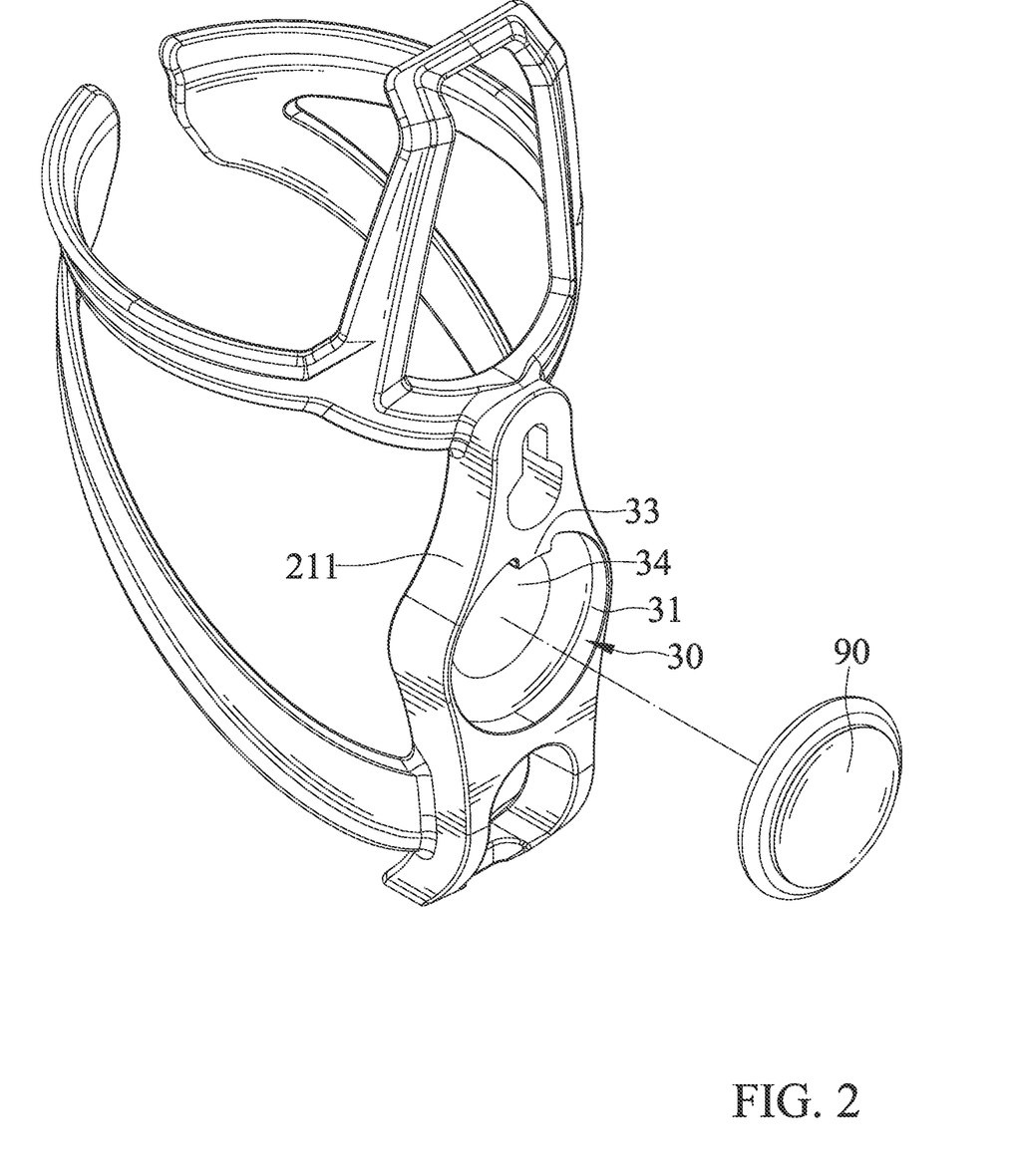
FIG. 2 is an exploded perspective view of the bottle cage of FIG. 1.
Figure 3:
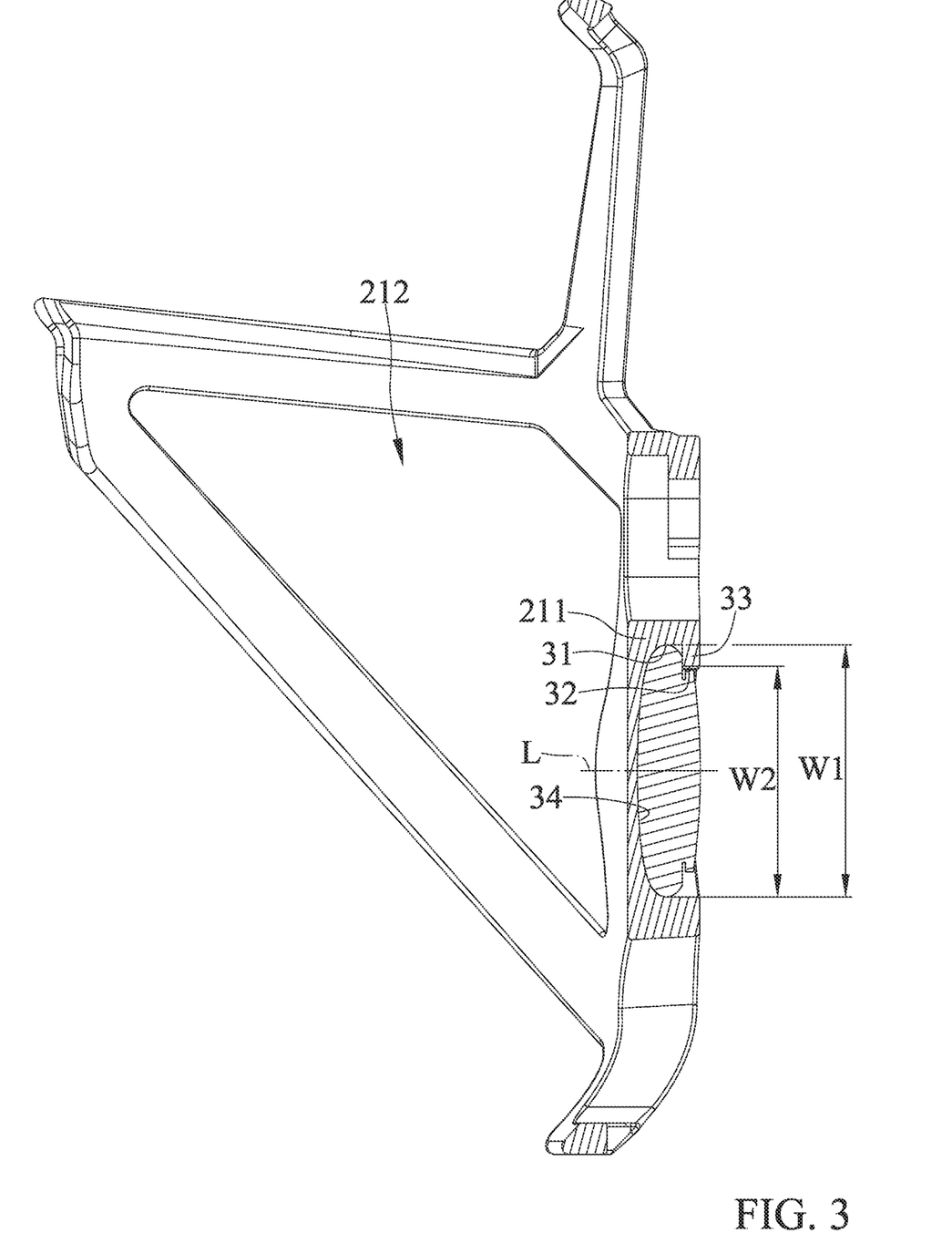
FIG. 3 is a cross-sectional view of the bottle cage of FIG. 1.

FIGS. 1 through 3 show a bottle cage 10 in accordance with a first embodiment of the present invention. The bottle cage 10 includes a storage space 30 and an electronic device 90 with satellite positioning function installed therein in a separable installation manner. The storage space 30 has a wide section 31 and a narrow section 32 arranged axially along a reference line L. The wide and the narrow sections 31 and 32 include widths thereof extending transversely to the reference line L. The wide section 31 has a first width W1 and the narrow section 32 has a second width W2 respectively. The second width W2 is smaller than the first width W1. The wide section 31 has a circular periphery surrounding the reference line L. The storage space 30 forms a bottom surface 34. The bottom surface 34 and to the narrow section 32 are at opposite sides of the wide section 31. The bottom surface 34 is curved. The electronic device 90 is connectible with a mobile electronic device. The position of the electronic device 90 can be known through the mobile electronic device.

The bottle cage 10 also includes a body 20 with a primary support 21, The primary support 21 includes a mounting portion 211 for connecting with an object. Preferably, the object is subject to movement. Preferably, the object is a vehicle. Preferably, the object is a bike. Therefore, if a bike is equipped with bottle cage 10, the bike is satellite positioned by the electronic device 90 on the bottle cage 10. The primary support 21 also includes a holding portion 212 for holding a bottle. The holding portion 212 is at a side of the mounting portion 211. Additionally, the wide section 31 and the holding portion 212, 212a extend on opposite sides of the mounting portion 211.

The storage space 30 also includes the narrow section 32 thereof delimited in the body 20. The narrow section 32 includes a retaining structure 33 disposed thereon adapted to retain the electronic device 90. The second width W2 measures a distance between the retaining structure 33 and a periphery of the storage space 30, which is opposite the retaining structure 33. The retaining structure 33 is adjacent to the wide section 31. The retaining structure 33 and the body 20 are integrally made in one piece.

Figure 4:
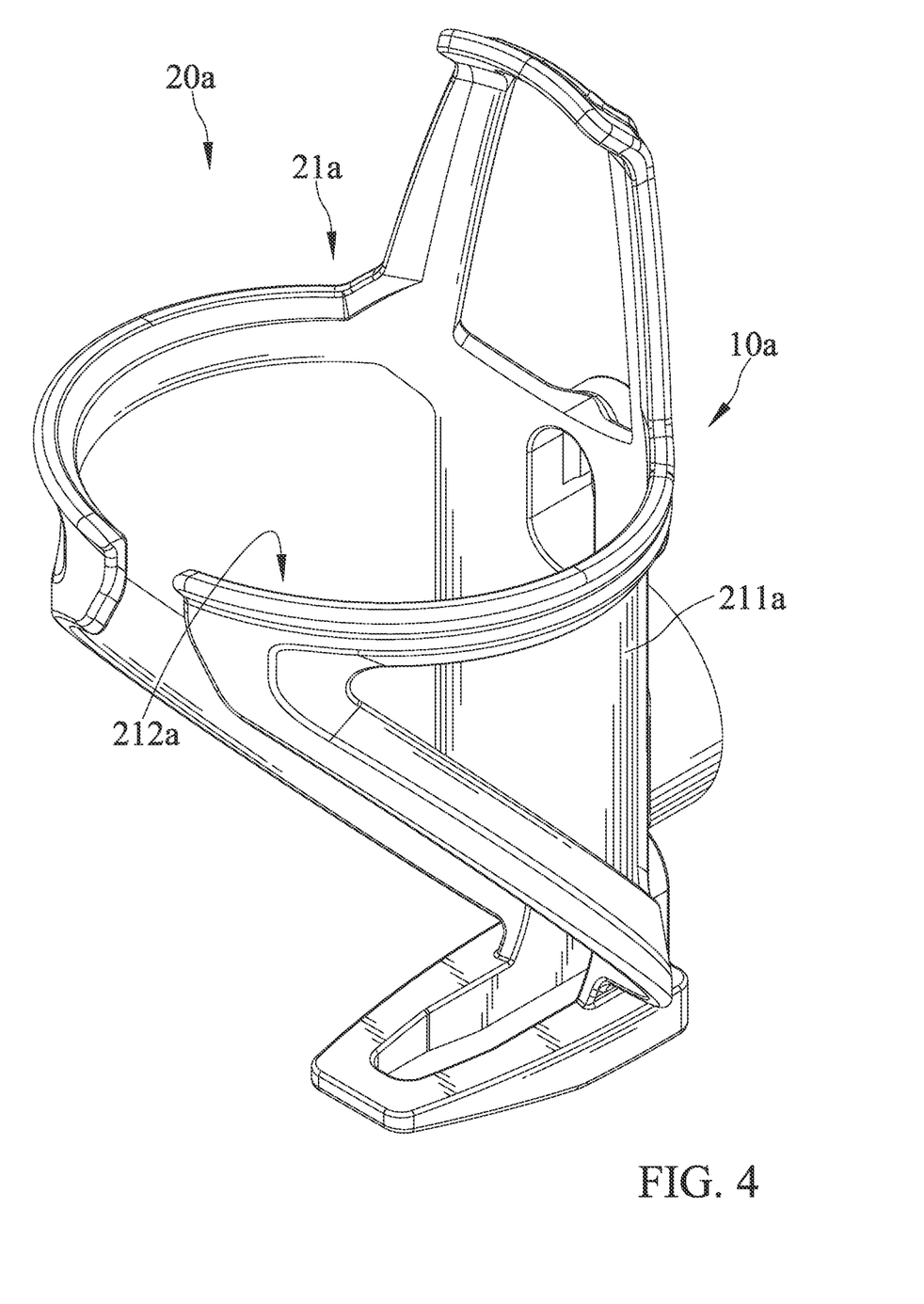
FIG. 4 is a perspective view a bottle cage in accordance with a second embodiment of the present invention.
Figure 5:
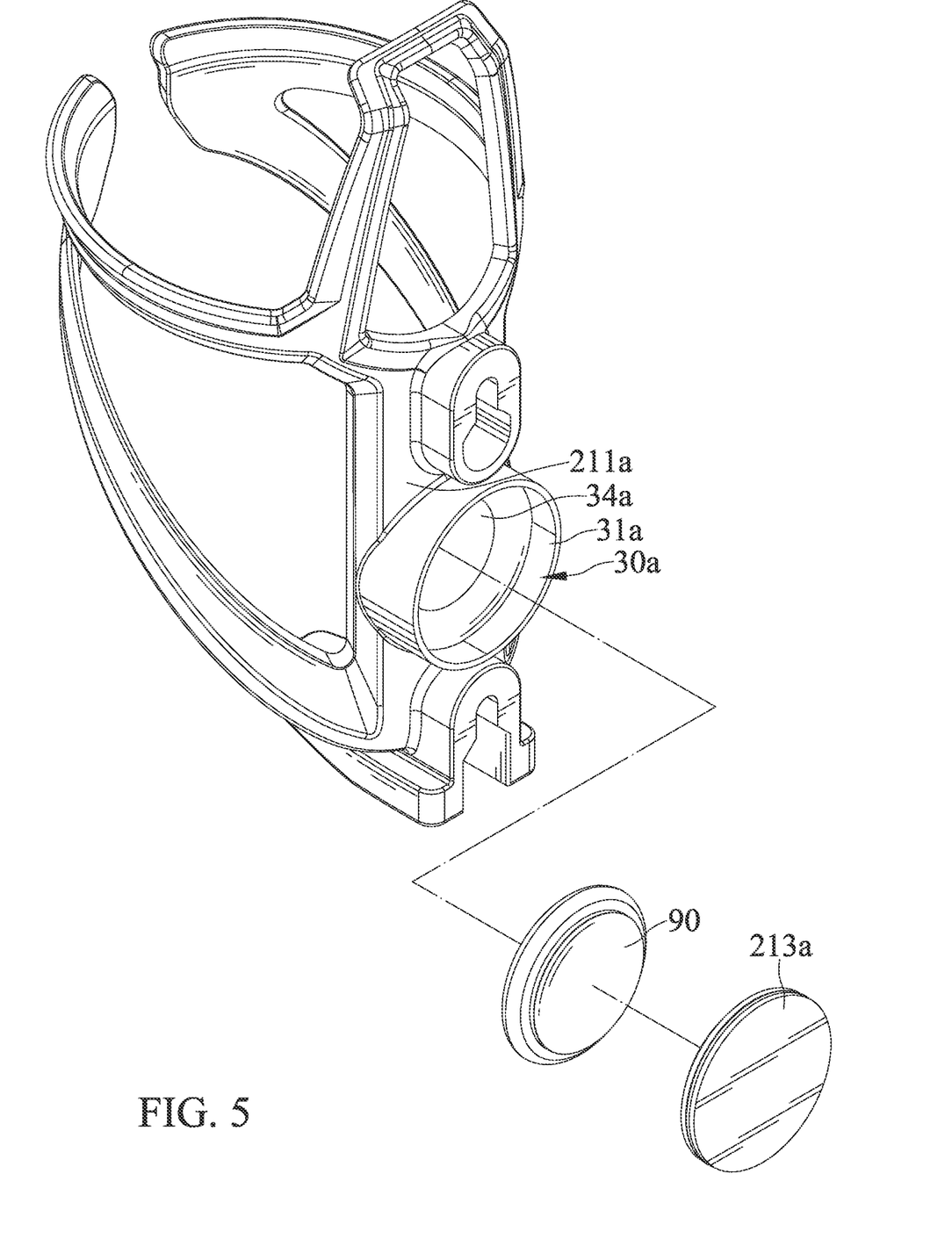
FIG. 5 is an exploded perspective view of the bottle cage of FIG. 4.
Figure 6:
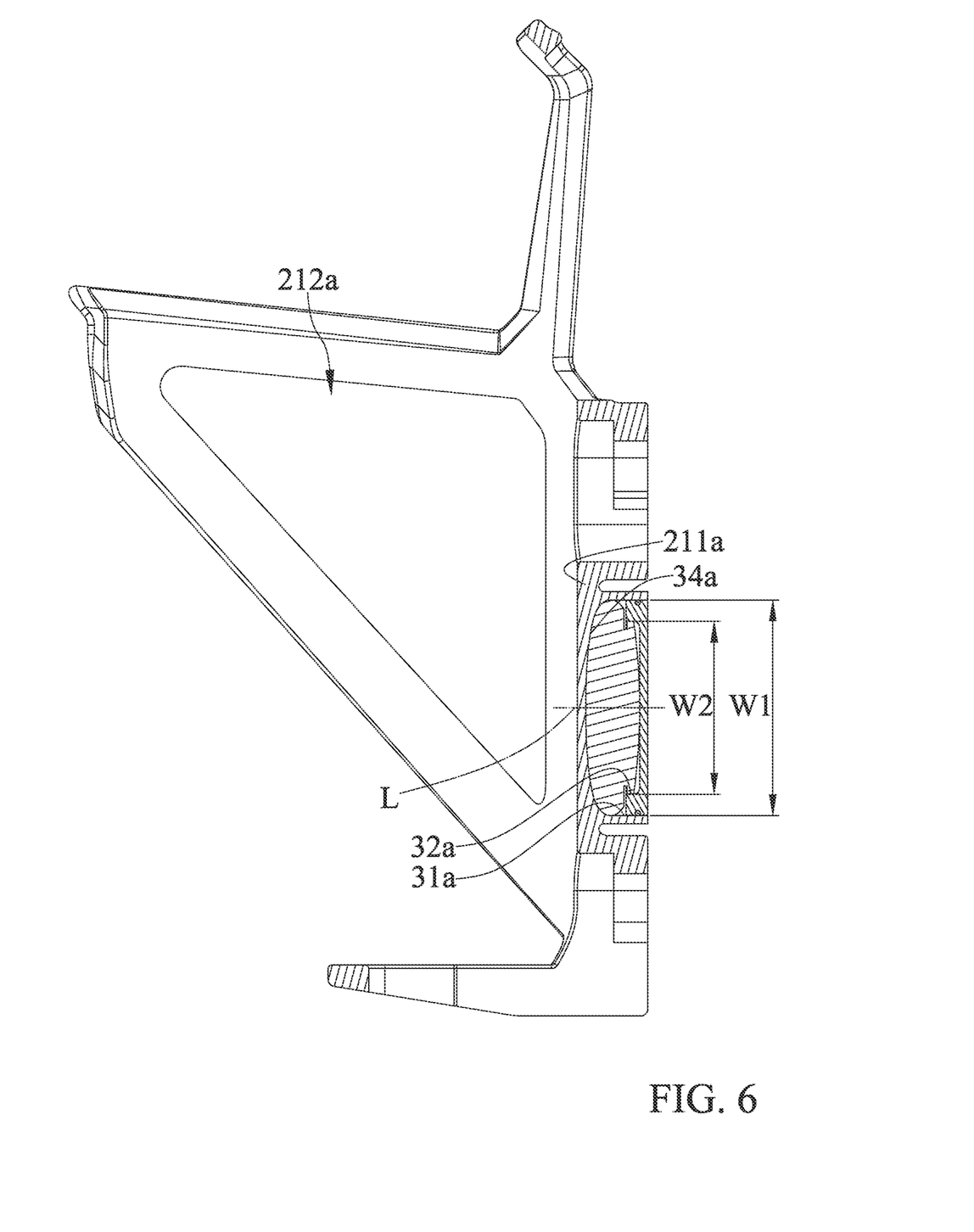
FIG. 6 is a cross-sectional view of the bottle cage of FIG. 4.

FIGS. 4 through 6 show a bottle cage 10a in accordance with a second embodiment of the present invention, and the same numbers are used to to correlate similar components of the first embodiment, but bearing a letter a. The bottle cage 10a includes a body 20a with a primary support 21a. The primary support 21a includes a mounting portion 211a and a holding portion 212a. The bottle cage 10a also includes a storage space 30a having a wide section 31a and a narrow section 32a. The first and the second embodiments are different in that a cover 213a is provided to retain the electronic device 90, the cover 213a is detachably connected with the storage space 30a, the storage space 30a has a wide section 31a delimited in the body 20a (i.e. the primary support 21a), and the storage space 30a has a narrow section 32a delimited in the cover 213a. Moreover, the cover 213a completely covers the electronic device 90. Therefore, the electronic device 90 can be better protected.

Figure 7:
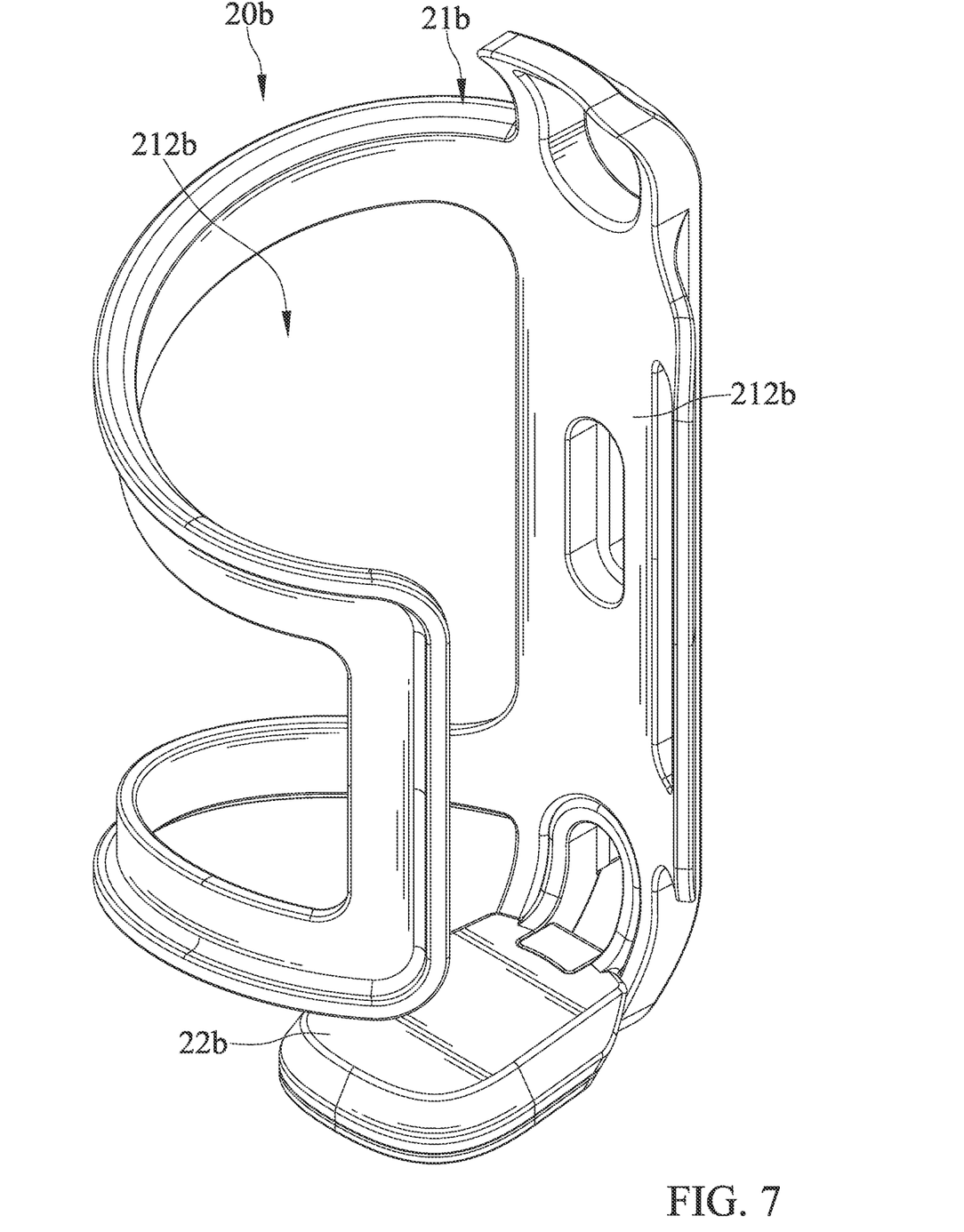
FIG. 7 a perspective view of a bottle cage in accordance with a third embodiment of the present invention.
Figure 8:
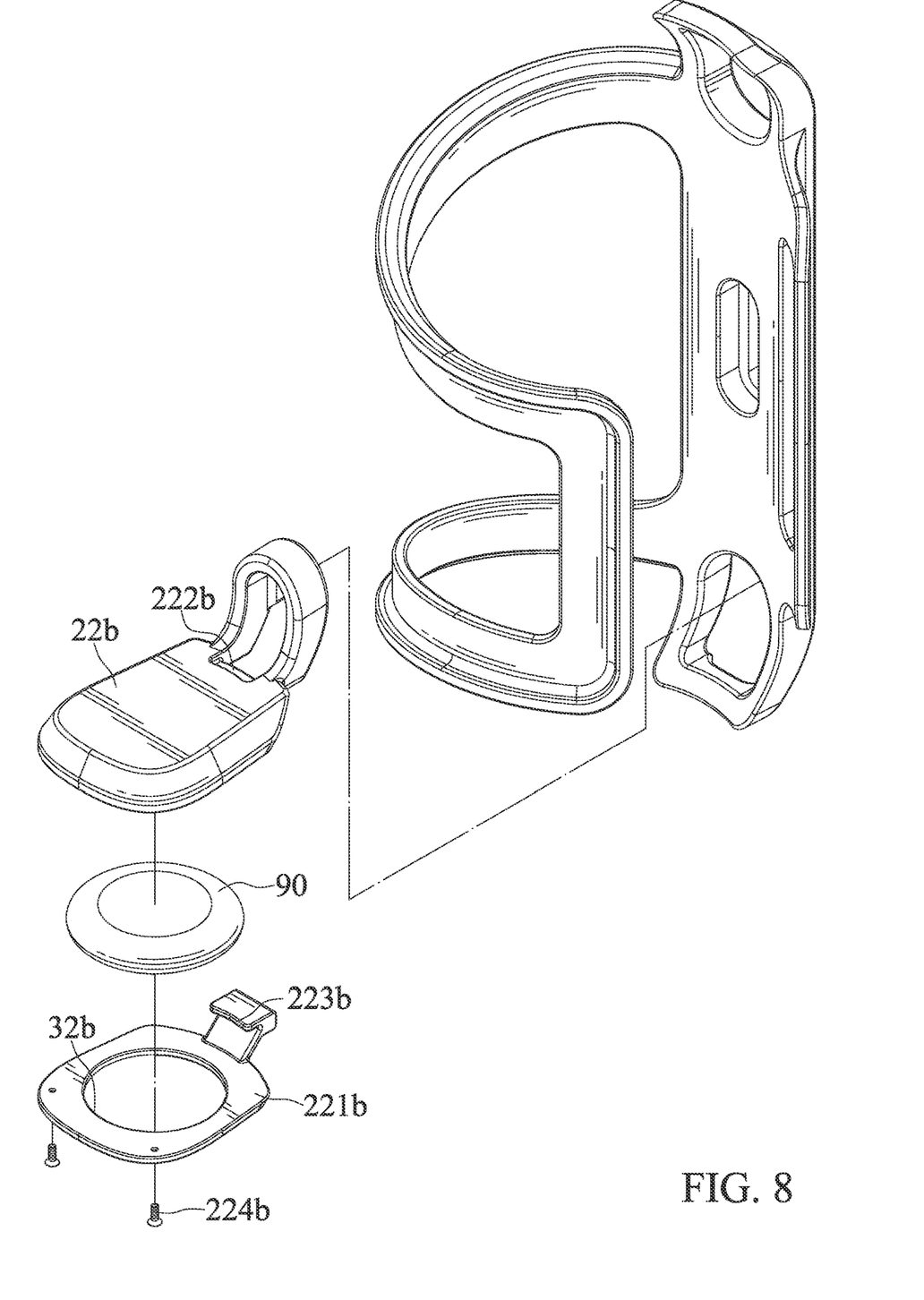
FIG. 8 is an exploded perspective view of the bottle cage of FIG. 7.
Figure 9:
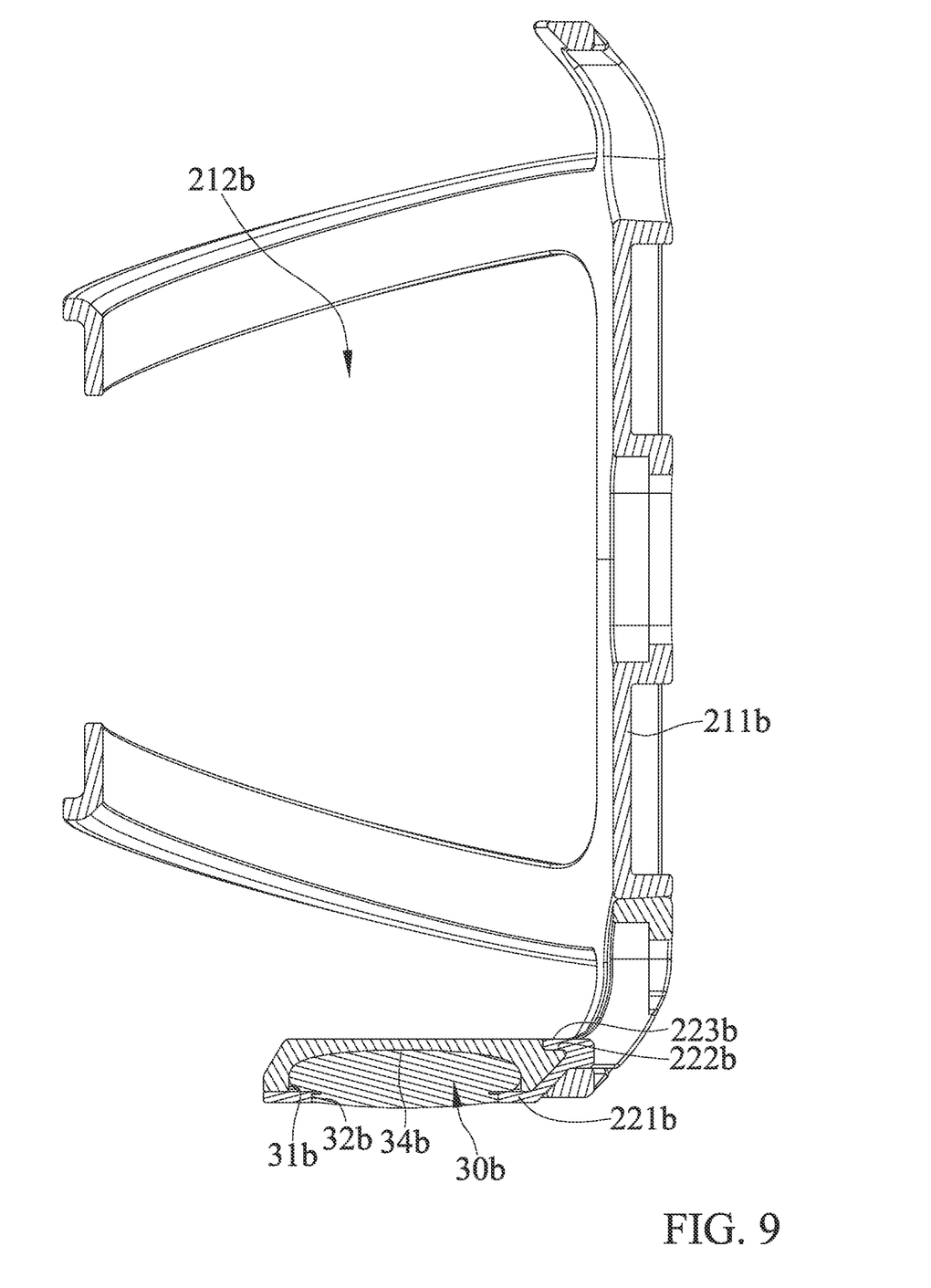
FIG. 9 is a cross-sectional view of the bottle cage of FIG. 7.

FIGS. 7 through 9 show a bottle cage in accordance with a third embodiment of the present invention, and the same numbers are used to correlate similar components of the first embodiment, but bearing a letter b. The bottle cage includes a body 20b with a primary support 21b. The primary support 21a includes a mounting portion 211b and a holding portion 212b. The bottle cage also includes a storage space 30b having a wide section 31b and a narrow section 32b. The first and the third embodiments are different in that a cover 221b is provided to retain the electronic device 90, the cover 221b is detachably connected with the storage space 30a, the body 20b farther includes a secondary support 22b, the secondary support 22b is connected with the mounting portion 211b, the secondary support 22b is adjacent to the holding portion 212b, the wide section 31b delimited in the secondary support 22b, and the narrow section 32b is delimited in the cover 221b. Moreover, the cover 221b, unlike the second embodiment, has an opening exposing the electronic device 90. The opening and the narrow section 32b are at opposite sides of the cover 221b.

Further, the secondary support 22b has a first connecting portion 222b for connecting with the cover 221b. The cover 2211b has a second connecting portion 223b connected with the first connecting portion 222b. The cover 221b and the secondary support 22b are fastened by at least one fastener 224b. The narrow section 32b is located between the at least one fastener 224b and the second connecting portion 223b. The at least one fastener 224b penetrates the cover 221b and the secondary support 22b in a screw-locking manner, but not limited thereto.

In view of the foregoing, the bottle cages 10 and 10a for holding a bottle can accommodate the electronic device 90 with satellite positioning function. Moreover, the bottle cages 10 and 10a house the electronic device 90 in a separable installation manner. Additionally, the electronic device 90 is retained in the storage spaces 30, 30a, and 30b.

The foregoing is merely illustrative of the principles of this invention, and various modifications can be made by those skilled in the art without departing from the scope and spirit of the invention.

What is claimed is:

1. The bottle cage comprising:
   a storage space, wherein the storage space has a wide section and a narrow section arranged axially along a reference line, wherein the wide and the narrow sections include widths thereof extending transversely to the reference line, wherein the wide section has a first width and the narrow section has a second width respectively, wherein the second width is smaller than the first width, and wherein the storage space includes an electronic device with satellite positioning function installed therein in a separable installation manner; and
   a body with a primary support, wherein the primary support includes a mounting portion for connecting with an object and a holding portion for holding a bottle, wherein the holding portion is at a side of the mounting portion, and wherein the wide section and the holding portion extend on opposite sides of the mounting portion.

2. The bottle cage as claimed in claim 1 further comprising a cover adapted to retain the electronic device, wherein the cover is detachably connected with the storage space, and wherein the narrow section is delimited in the cover.

3. The bottle cage as claimed in claim 1, wherein the storage space includes the narrow section thereof delimited in the body, wherein the narrow section includes a retaining structure disposed thereon adapted to retain the electronic device, wherein the second width measures a distance between the retaining structure and a periphery of the storage space, which is opposite the retaining structure, and wherein the retaining structure is adjacent to the wide section.

4. The bottle cage as claimed in claim 3, wherein the retaining structure and the body are integrally made in one piece.

5. The bottle cage comprising:
   a storage space, wherein the storage space has a wide section and a narrow section arranged axially along a reference line, wherein the wide and the narrow sections include widths thereof extending transversely to the reference line, wherein the wide section has a first width and the narrow section has a second width respectively, wherein the second width is smaller than the first width, and wherein the storage space includes an electronic device with satellite positioning function installed therein in a separable installation manner; and
   a body with a primary support and a secondary support, wherein the primary support includes a mounting portion for connecting with an object and a holding portion for holding a bottle, wherein the holding portion is at a side of the mounting portion, wherein the secondary support is connected with the mounting portion, wherein the secondary support is adjacent to the holding portion, and wherein the wide section is delimited in the secondary support.

6. The bottle cage as claimed in claim 5 further comprising a cover adapted to retain the electronic device, wherein the cover is detachably connected with the storage space, and wherein the narrow section is delimited in the cover.

7. The bottle cage as claimed in claim 6, wherein the secondary support has a first connecting portion for connecting with the cover, wherein the cover has a second connecting portion connected with the first connecting portion, wherein the cover and the secondary support are fastened by at least one fastener, and wherein the narrow section is located between the at least one fastener and the second connecting portion.

8. The bottle cage as claimed in claim 6, wherein the cover has an opening exposing the electronic device, and wherein the opening and the narrow section are at opposite sides of the cover.

9. The bottle cage comprising:
   a storage space, wherein the storage space has a wide section and a narrow section arranged axially along a reference line, wherein the wide and the narrow sections include widths thereof extending transversely to the reference line, wherein the wide section has a first width and the narrow section has a second width respectively, wherein the second width is smaller than the first width, and wherein the storage space includes an electronic device with satellite positioning function installed therein in a separable installation manner; and wherein the wide section has a circular periphery surrounding the reference line, wherein the storage space forms a bottom surface, wherein the bottom surface and the narrow section are at opposite sides of the wide section and wherein the bottom surface is curved.

\* \* \* \* \*